United States Patent
Aketa et al.

(10) Patent No.: US 9,347,351 B2
(45) Date of Patent: May 24, 2016

(54) EXHAUST TREATMENT DEVICE FOR DIESEL ENGINE

(71) Applicant: KUBOTA Corporation, Osaka-shi, Osaka (JP)

(72) Inventors: Masahiro Aketa, Sakai (JP); Yosuke Matsukawa, Sakai (JP); Satoshi Sugimoto, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 0 days.

(21) Appl. No.: 14/383,152

(22) PCT Filed: Feb. 25, 2013

(86) PCT No.: PCT/JP2013/054718
§ 371 (c)(1),
(2) Date: Sep. 5, 2014

(87) PCT Pub. No.: WO2013/145994
PCT Pub. Date: Oct. 3, 2013

(65) Prior Publication Data
US 2015/0033708 A1   Feb. 5, 2015

(30) Foreign Application Priority Data
Mar. 30, 2012   (JP) ................. 2012-080834

(51) Int. Cl.
*F01N 3/00*     (2006.01)
*F01N 3/08*     (2006.01)
(Continued)

(52) U.S. Cl.
CPC ............ *F01N 3/0892* (2013.01); *F01N 3/01* (2013.01); *F01N 3/037* (2013.01); *F02M 25/074* (2013.01); *F02M 25/0718* (2013.01); *Y02T 10/121* (2013.01); *Y02T 10/20* (2013.01)

(58) Field of Classification Search
CPC ....... F01N 3/0892; F01N 3/01; F01N 3/0275; F01N 2240/28; F01N 2240/34; F01N 13/02; F02B 3/06; B01D 53/32; B01D 53/323; B01D 2259/80

USPC ................. 60/273, 274, 275, 278, 279, 605.2
See application file for complete search history.

(56) References Cited

U.S. PATENT DOCUMENTS 4,380,900 A * 4/1983 Linder ................ B03C 3/32
                                             55/459.3
4,478,613 A * 10/1984 Brettschneider ...... B03C 3/0175
                                             55/DIG. 30
(Continued)

FOREIGN PATENT DOCUMENTS

DE   102011089489 A1 * 6/2013 ............... B60K 1/04
JP   S56-129846 U    10/1981
(Continued)

OTHER PUBLICATIONS

Machine Translation of JP 2010-276012, Translated on Sep. 29, 2015.*
(Continued)

Primary Examiner — Patrick Maines
(74) Attorney, Agent, or Firm — Panitch Schwarze Belisario & Nadel LLP

(57) ABSTRACT

A diesel engine exhaust treatment device includes an exhaust flow divider in an exhaust path. The flow divider causes exhaust to flow EGR gas with PM unevenly distributed and remaining discharged gas in a divided manner. EGR gas is recirculated to a combustion chamber, and the discharged gas is atmospherically discharged. First and second corona discharge passages are provided at the exhaust flow divider. Corona discharge in the first discharge passage causes the PM, water vapor, and oxygen in the exhaust to generate electron attachment. Electrostatic force causes the exhaust to flow the EGR gas with the electron-attached PM, water vapor, and oxygen unevenly distributed and the remaining discharged gas in a divided manner. The discharged gas is guided to the second discharge passage. Corona discharge in the second discharge passage causes gas molecules in the discharged gas to dissociate, and NOx in the discharged gas is reduced to nitrogen.

20 Claims, 7 Drawing Sheets

(51) Int. Cl.
*F01N 3/037* (2006.01)
*F02M 25/07* (2006.01)
*F01N 3/01* (2006.01)

(56) References Cited

U.S. PATENT DOCUMENTS

| | | | | |
|---|---|---|---|---|
| 4,587,807 | A * | 5/1986 | Suzuki | B03C 3/15 123/536 |
| 4,588,423 | A * | 5/1986 | Gillingham | B03C 3/011 55/431 |
| 4,689,951 | A * | 9/1987 | Polach | B03C 3/019 60/275 |
| 5,458,850 | A * | 10/1995 | Krutzsch | B01D 49/00 422/168 |
| 6,092,512 | A * | 7/2000 | Ma | F02B 1/12 123/568.15 |
| 2005/0061152 | A1 * | 3/2005 | Liu | B03C 3/68 96/80 |
| 2006/0021327 | A1 * | 2/2006 | Kiser | F02M 25/0718 60/278 |
| 2010/0218549 | A1 * | 9/2010 | Suzuki | F24F 1/022 62/498 |
| 2011/0209986 | A1 * | 9/2011 | Kitada | B82Y 25/00 204/192.15 |
| 2012/0000186 | A1 | 1/2012 | Aketa et al. | |
| 2012/0137680 | A1 * | 6/2012 | Nam | F02C 6/12 60/605.2 |

FOREIGN PATENT DOCUMENTS

| | | | | |
|---|---|---|---|---|
| JP | 07091328 | A | * | 4/1995 |
| JP | 2000282965 | A | * | 10/2000 |
| JP | 2003-178814 | A | | 6/2003 |
| JP | 2003178814 | A | * | 6/2003 |
| JP | 2003-236335 | A | | 8/2003 |
| JP | 2005-291071 | A | | 10/2005 |
| JP | 2007-278194 | A | | 10/2007 |
| JP | 2007278194 | A | * | 10/2007 |
| JP | 2010-276012 | A | | 12/2010 |
| JP | 2010276012 | A | * | 12/2010 |
| JP | 2011-085086 | A | | 4/2011 |
| JP | 2012062847 | A | * | 3/2012 |
| WO | 2010010731 | A1 | | 1/2010 |

OTHER PUBLICATIONS

Int'l Search Report issued Apr. 16, 2013 in Int'l Application No. PCT/JP2013/054718.

Extended Search Report issued Oct. 15, 2015 in EP Appln. 13768358.7.

* cited by examiner

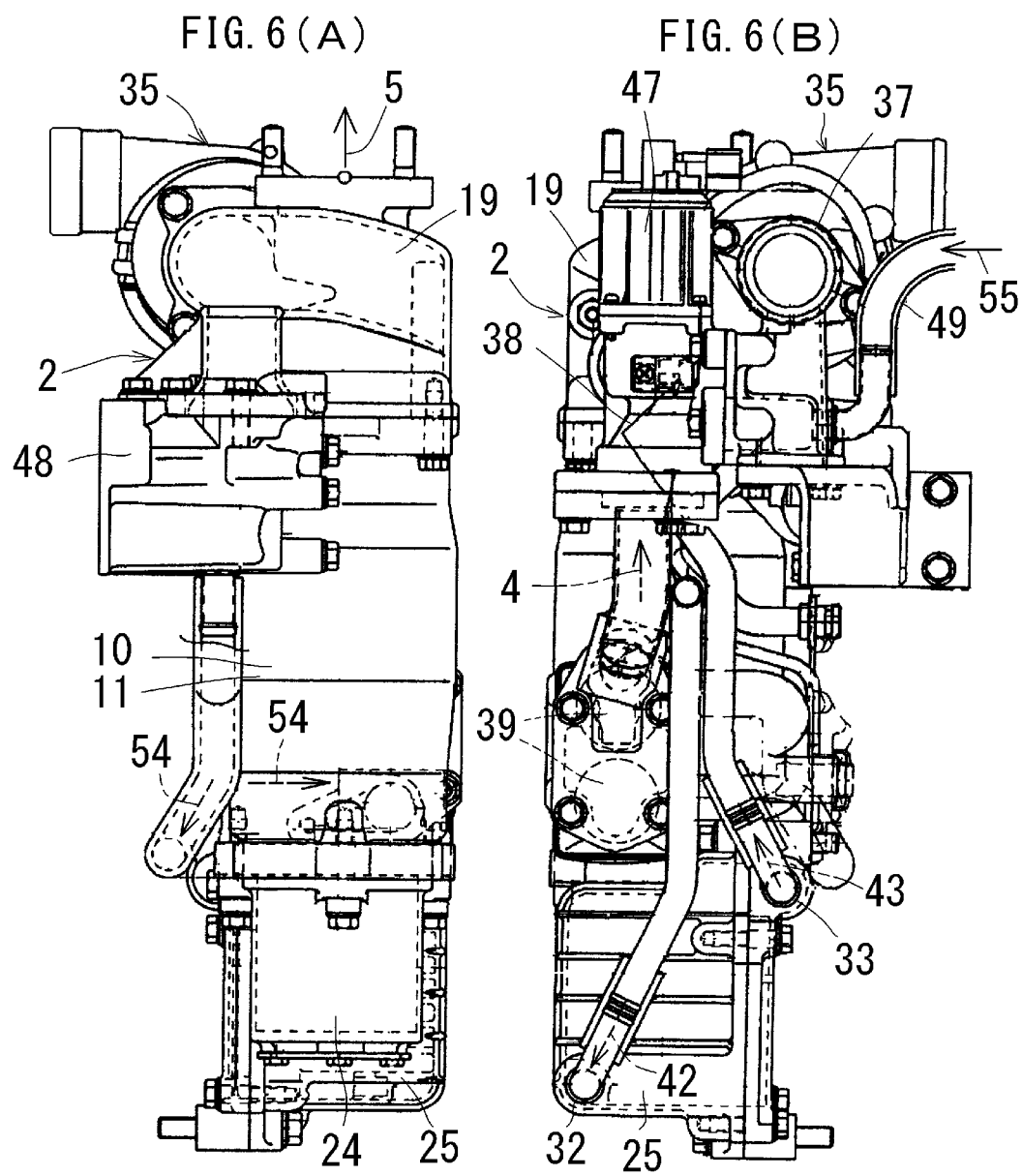

ved. United States Patent US 9,347,351 B2

EXHAUST TREATMENT DEVICE FOR DIESEL ENGINE

CROSS-REFERENCE TO RELATED APPLICATION

This application is a Section 371 of International Application No. PCT/JP2013/054718, filed Feb. 25, 2013, which was published in the Japanese language on Oct. 3, 2013, under International Publication No. WO 2013/145994 A1, and the disclosure of which is incorporated herein by reference.

TECHNICAL FIELD

The present invention relates to an exhaust treatment device for a diesel engine, and particularly to an exhaust treatment device for a diesel engine capable of reducing NOx concentration in a discharged gas.

Among terms used in this description and claims, "EGR gas" is an abbreviation of an exhaust gas recirculation gas, "DPF" is an abbreviation of a diesel particulate filter, "PM" is an abbreviation of particulate matter contained in an exhaust, "NOx" is a general term for nitrogen oxides, and "$N_2$" is a molecular formula of nitrogen.

BACKGROUND ART

Conventionally, there has been proposed a device in which an exhaust flow divider is provided in an exhaust path, the exhaust flow divider causes an exhaust to flow an EGR gas with PM unevenly distributed and a remaining discharged gas in a divided manner, the EGR gas is recirculated to a combustion chamber, and the discharged gas is discharged to an atmospheric side (see, for example, Patent Document 1).

According to an exhaust treatment device for a diesel engine of this type, the PM contained in the EGR gas is incinerated by heat generated from incineration in the combustion chamber during an engine operation. As a result, a DPF can be omitted. Alternatively, the DPF can be miniaturized by using the DPF and the exhaust flow divider in combination. In other words, since it is not necessary to store much PM, the exhaust flow divider can be more miniaturized than the DPF. In both a case where the exhaust flow divider is used instead of the DPF and a case where the DPF and the exhaust flow divider are used in combination, there is an advantage that the engine can be miniaturized.

However, since an NOx reduction treatment of the discharged gas is not performed, this conventional technology is problematic.

PRIOR ART DOCUMENTS

Patent Documents

Patent Document 1: Japanese Patent Application Laid-Open No. 2010-276012 (see FIG. 2)

SUMMARY OF THE INVENTION

Problems to be Solved by the Invention

<<Problem>> NOx concentration in a discharged gas is high.

Since a NOx reduction treatment of the discharged gas is not performed, the NOx concentration in the discharged gas is high.

An object of the present invention is to provide an exhaust treatment device for a diesel engine capable of reducing NOx concentration in a discharged gas.

Solutions to the Problems

Matters specifying an invention according to a first aspect of the present invention are as follows.

As illustrated in FIG. 1, an exhaust treatment device for a diesel engine in which an exhaust flow divider (2) is provided in an exhaust path (1), the exhaust flow divider (2) causes an exhaust (3) to flow an EGR gas (4) with PM unevenly distributed and a remaining discharged gas (5) in a divided manner, the EGR gas (4) is recirculated to a combustion chamber (6), and the discharged gas (5) is discharged to an atmospheric side, wherein as illustrated in FIG. 2 or FIG. 3, a first corona discharge passage (7) and a second corona discharge passage (8) are provided at the exhaust flow divider (2), corona discharge in the first corona discharge passage (7) causes the PM, water vapor, and oxygen in the exhaust (3) to generate electron attachment, and electrostatic force causes the exhaust (3) to flow the EGR gas (4) with the electron-attached PM, water vapor, and oxygen unevenly distributed and the remaining discharged gas (5) in a divided manner, the discharged gas (5) is guided to the second corona discharge passage (8), corona discharge in the second corona discharge passage (8) causes gas molecules in the discharged gas (5) to dissociate, and NOx in the discharged gas (5) is reduced to $N_2$.

Effects of the Invention (A First Aspect of the Present Invention)

The first aspect of the present invention exhibits the following effects.

<<Effect>> NOx concentration in the discharged gas can be greatly reduced.

As illustrated in FIG. 1, since the water vapor is unevenly distributed in the EGR gas, as a combustion temperature of the combustion chamber (6) is reduced low by the water vapor having large specific heat, a generation amount of NOx can be reduced.

Since the water vapor and the oxygen are unevenly distributed in the EGR gas (4), a ratio of these components in the discharged gas (5) is reduced. Since the water vapor and the oxygen become inhibiting factors of a reduction reaction of the NOx by the corona discharge, the NOx in the discharged gas (5) with the reduced ratio of the water vapor and the oxygen is efficiently reduced to $N_2$ by the corona discharge in the second corona discharge passage (8).

From these reasons, the NOx concentration in the discharged gas (5) can be greatly reduced.

<<Effect>> Improvement of an engine output can be achieved.

Since the oxygen is unevenly distributed in the EGR gas (4), oxygen concentration in the combustion chamber (6) can be increased, and improvement of the engine output can be achieved due to the increase in a fuel injection amount.

(A Second Aspect of the Present Invention)

In addition to the effects of the first aspect of the present invention, the second aspect of the present invention exhibits the following effects.

<<Effect>> PM concentration in the EGR gas can be enhanced.

As illustrated in FIG. 2 or FIG. 3, the electron-attached PM in the exhaust (3) swirling in an exhaust swirling passage (10)

is unevenly distributed near an outer circumference wall (11) of the exhaust swirling passage (10) by electrostatic force and centrifugal force, and the EGR gas (4) containing the electron-attached PM unevenly distributed is caused to flow to an exhaust swirling passage end part (12) in a divided manner. Accordingly, the PM is unevenly distributed efficiently near the outer circumference wall (11) of the exhaust swirling passage (10), and the PM concentration in the EGR gas (4) can be enhanced. As a result, the PM is hardly discharged to an atmospheric side.

<<Effect>> PM having different weights or particle diameters can be taken into the EGR gas uniformly.

As illustrated in FIG. 2 or FIG. 3, the electron-attached PM in the exhaust (3) swirling in the exhaust swirling passage (10) is unevenly distributed near the outer circumference wall (11) of the exhaust swirling passage (10) by electrostatic force and centrifugal force, and the EGR gas (4) containing the electron-attached PM unevenly distributed is caused to flow to the exhaust swirling passage end part (12) in a divided manner. Accordingly, both heavy PM on which the centrifugal force acts effectively, and light PM on which the electrostatic force acts effectively, can be uniformly taken into the EGR gas (4), and the PM having different weights or particle diameters can be taken into the EGR gas uniformly. As a result, the PM is hardly discharged to the atmospheric side.

(A Third Aspect of the Present Invention)

In addition to the effects of the second aspect of the present invention, the third aspect of the present invention exhibits the following effect.

<<Effect>> Electron-attached components in the exhaust hardly enter a discharged gas lead-out passage in a center cylinder.

As illustrated in FIG. 2 or FIG. 3, a discharged gas entry port (13) is provided at a center cylinder (9) serving as a negative electrode of the first corona discharge passage (7), an interior of the center cylinder (9) serves as a discharged gas lead-out passage (14), and the discharged gas (5) near the center cylinder (9) in the exhaust swirling passage (10) is caused to flow from the discharged gas entry port (13) into the discharged gas lead-out passage (14) in a divided manner. Accordingly, the electron-attached PM, water vapor, and oxygen are kept away from the center cylinder (9) by electrostatic force, and these do not easily enter the discharged gas entry port (13). As a result, the PM, the water vapor, and the oxygen are hardly discharged into the atmosphere, and these are efficiently supplied to the combustion chamber (6) as unevenly distributed components of the EGR gas (4).

(A Fourth Aspect of the Present Invention)

In addition to the effect of the third aspect of the present invention, the fourth aspect of the present invention exhibits the following effect.

<<Effect>> The exhaust flow divider can be configured compact.

As illustrated in FIG. 2 or FIG. 3, a swirling approach passage (19), the exhaust swirling passage (10) serving as the first corona discharge passage (7), the discharged gas lead-out passage (14), a discharged gas relay passage (18), and the second corona discharge passage (8) can be configured as a passage structure of concentric double cylinders, and the exhaust flow divider (2) can be configured compact.

(A Fifth Aspect of the Present Invention)

In addition to the effects of any of the second to fourth aspects of the present invention, the fifth aspect of the present invention exhibits the following effect.

<<Effect>> Backflow of the PM from an EGR swirling chamber to an exhaust swirling passage end part can be prevented.

As illustrated in FIG. 2 or FIG. 3, an EGR gas swirling chamber (20) is provided adjacent to the exhaust swirling passage end part (12), an EGR gas outlet (22) is provided on an EGR gas swirling chamber circumference wall (21) surrounding a periphery of the EGR gas swirling chamber (20), a partition (23) is provided between the exhaust swirling passage end part (12) and the EGR gas swirling chamber (20), and the EGR gas (4) is introduced from the exhaust swirling passage end part (12) to the EGR gas swirling chamber (20) via a gap between a peripheral edge part of this partition (23) and the EGR gas swirling chamber circumference wall (21). Accordingly, the EGR gas (4) does not short-circuit from the exhaust swirling passage end part (12) to the EGR gas outlet (22). Even in a case where supply of the EGR gas (4) to the combustion chamber (6) is stopped or reduced, swirling of the EGR gas (4) in the EGR gas swirling chamber (20) is maintained, and backflow of the PM from the EGR swirling chamber (20) to the exhaust swirling passage end part (12) can be prevented.

(A Sixth Aspect of the Present Invention)

In addition to the effects of any of the first to fifth aspects of the present invention, the sixth aspect of the present invention exhibits the following effect.

<<Effect>> It is not necessary to wire a high tension cable for supplying an electricity from a power supply to the electrode of each corona discharge passage outside the exhaust treatment device.

As illustrated in FIG. 2 or FIG. 3, a power supply relay box (24) is mounted to a lower end part of the exhaust flow divider (2), a power supply box (25) is mounted to a lateral side of this power supply relay box (24), an electric insulator (27) is provided on a lower end wall (26) of the exhaust flow divider (2), a conductor (28) penetrating the electric insulator (27) is introduced from the power supply relay box (24) to the exhaust flow divider (2), and a current is supplied from a power supply (29) in the power supply box (25) to the electrodes of the both corona discharge passages (7) (8) in the exhaust flow divider (2) via this conductor (28). Accordingly, it is not necessary to wire a high tension cable for supplying the electricity from the power supply (29) to the electrodes of the respective corona discharge passages (7) (8) outside the exhaust treatment device.

(A Seventh Aspect of the Present Invention)

In addition to the effect of the sixth aspect of the present invention, the seventh aspect of the present invention exhibits the following effects.

<<Effect>> Efficient corona discharge at a proper place in each corona discharge passage can be obtained.

A pulse superposition type DC power supply is used for the power supply (29), and a DC current and a pulse current superposed on the DC current are supplied to the electrodes of the both corona discharge passages (7) (8) of the exhaust flow divider (2). Accordingly, the DC current is regularly leaked to soot attached to a surface of the electric insulator (27), excessive attachment of soot is prevented by heating and removing the soot using the leak current, corona discharge at an improper place generated by the soot serving as an electrode is suppressed, and efficient corona discharge at proper places in the respective corona discharge passages (7) (8) can be obtained.

<<Effect>> A regulated pulse current waveform can be obtained.

The pulse superposition type DC power supply is used for the power supply (29), and the DC current and the pulse current superposed on the DC current are supplied to the electrodes of the both corona discharge passages (7)(8) of the exhaust flow divider (2). Accordingly, a voltage boosting time of the current pulse is shortened, and the regulated pulse current waveform can be obtained.

(An Eighth Aspect of the Present Invention)

In addition to the effects of the sixth or seventh aspect of the present invention, the eighth aspect of the present invention exhibits the following effect.

<<Effect>> Overheat of an inside of the power supply relay box is prevented.

As illustrated in FIG. 2 or FIG. 3, an outside air introduction port (30) is opened at a lower end part of the power supply relay box (24), an inside air lead-out port (31) is opened at an upper part of the power supply relay box (24), and due to convection of air by heat within the power supply relay box (24), an inside air (41) in the power supply relay box (24) is discharged from the inside air lead-out port (31), and an outside air (40) is introduced into the power supply relay box (24) from the outside air introduction port (30). Accordingly, ventilation inside the power supply relay box (24) is performed, and overheat of the inside of the power supply relay box (24) is prevented.

(A Ninth Aspect of the Present Invention)

In addition to the effects of any of the sixth to eighth aspects of the present invention, the ninth aspect of the present invention exhibits the following effect.

<<Effect>> Overheat of the power supply within the power supply box is prevented.

As illustrated in FIG. 2, a clear air inlet (32) and an inside air outlet (33) are provided in the power supply box (25), the clean air inlet (32) is communicated with an air cleaner (34), the inside air outlet (33) is communicated with an air compressor inlet (36) of a supercharger (35), an inside air (43) within the power supply box (25) is discharged from the inside air outlet (33) with suction force of the supercharger (35), and a clean air (42) in the air cleaner (34) is introduced into the power supply box (25) from the clean air inlet (32). Accordingly, ventilation inside the power supply box (25) is performed, and overheat of the power supply (29) inside the power supply box (25) is prevented.

(A Tenth Aspect of the Present Invention)

In addition to the effects of any of the sixth to ninth aspects of the present invention, the tenth aspect of the present invention exhibits the following effect.

<<Effect>> The exhaust treatment device can be configured compact.

As illustrated in FIG. 2, FIG. 5, FIGS. 6 (A) (B), since the supercharger (35) positioned directly above the power supply box (25) is mounted on an upper lateral side of the exhaust flow divider (2), the exhaust treatment device can be configured compact.

(An Eleventh Aspect of the Present Invention)

In addition to the effects of any of the sixth to tenth aspects of the present invention, the eleventh aspect of the present invention exhibits the following effect.

<<Effect>> The exhaust treatment device can be configured compact.

As illustrated in FIG. 5 and FIG. 6(B), an intake air inlet pipe (37) is mounted to the air compressor inlet (36) of the supercharger (35), an EGR valve case (38) is mounted to the intake air inlet pipe (37), an EGR cooler (39) positioned directly above the power supply box (25) is mounted on a lower lateral side of the exhaust flow divider (2), and the EGR gas outlet (22) of the exhaust flow divider (2) is communicated with the EGR valve case (38) via the EGR cooler (39). Accordingly, the exhaust treatment device can be configured compact.

BRIEF DESCRIPTION OF THE DRAWINGS

FIG. 6(A) is a diagram of the device in FIG. 5 as viewed from a VIA direction, and FIG. 6(B) is a diagram of the device in FIG. 5 as viewed from a VIB direction.

EMBODIMENTS OF THE INVENTION

FIGS. 1 to 7 are diagrams explaining an exhaust treatment device for a diesel engine according to an embodiment of the present invention. In this embodiment, an exhaust treatment device for a multi-cylinder diesel engine will be described.

Figure 1:
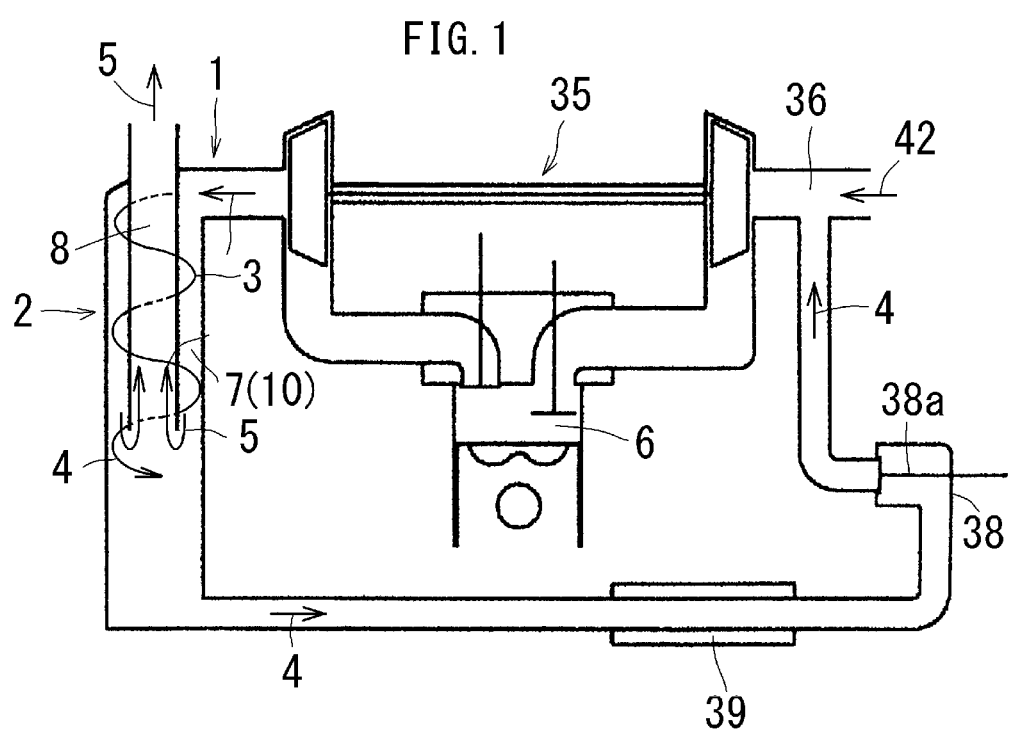
FIG. 1 is an exemplary diagram of an exhaust treatment device for a diesel engine according to an embodiment of the present invention.

As illustrated in FIG. 1, an exhaust flow divider (2) is provided in an exhaust path (1), the exhaust flow divider (2) causes an exhaust (3) to flow an EGR gas (4) with unevenly distributed PM and a remaining discharged gas (5) in a divided manner, the EGR gas (4) is recirculated to a combustion chamber (6), and the discharged gas (5) is discharged to an atmospheric side.

The EGR gas (4) is sucked into an air compressor inlet (36) of a supercharger (35) through an EGR cooler (39) and an EGR valve case (38). An arrow sign (42) in the drawing indicates a clean air from an air cleaner.

Figure 2:
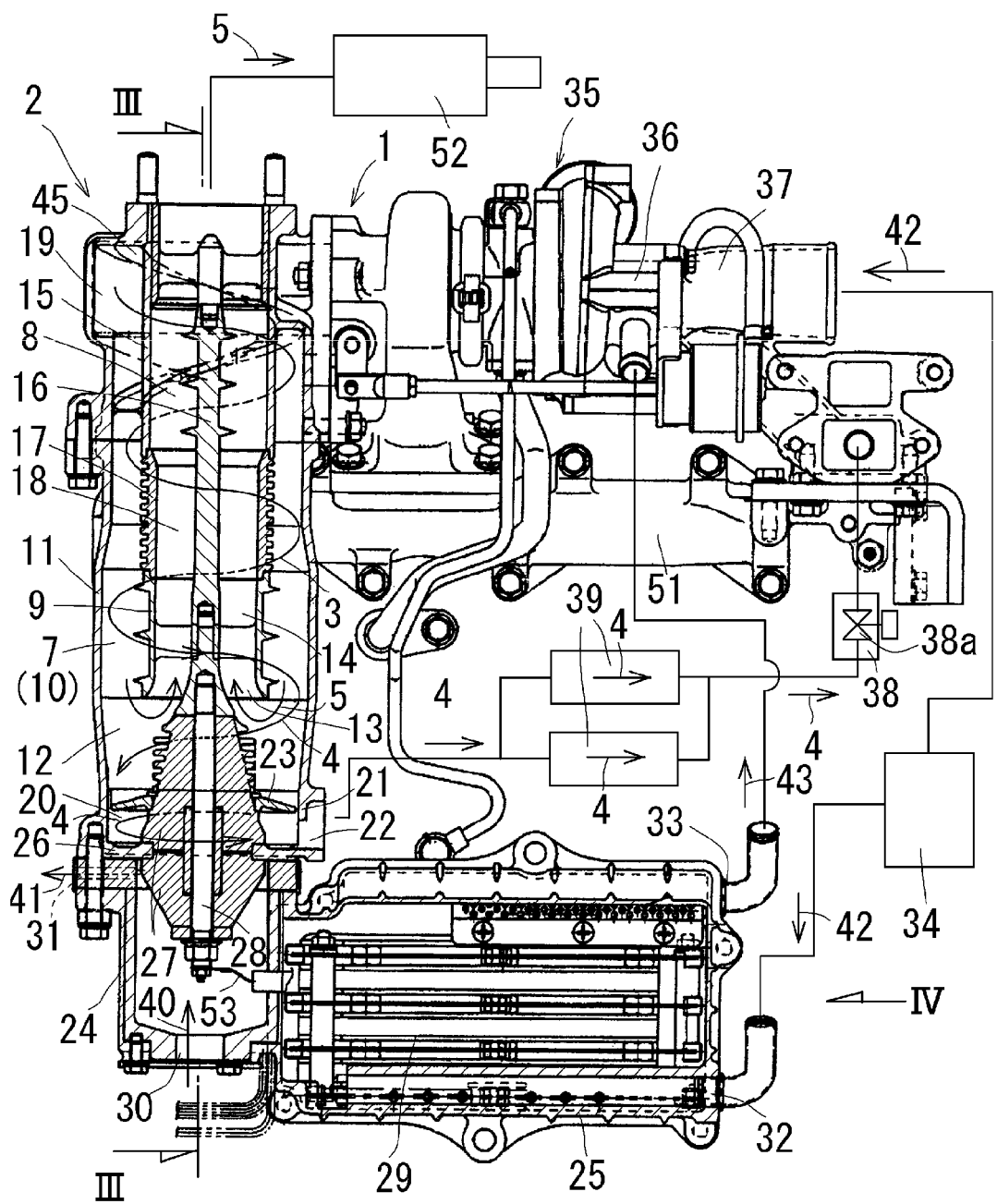
FIG. 2 is a longitudinal cross-sectional side view of a part of the exhaust treatment device for the diesel engine according to the embodiment of the present invention.
Figure 3:
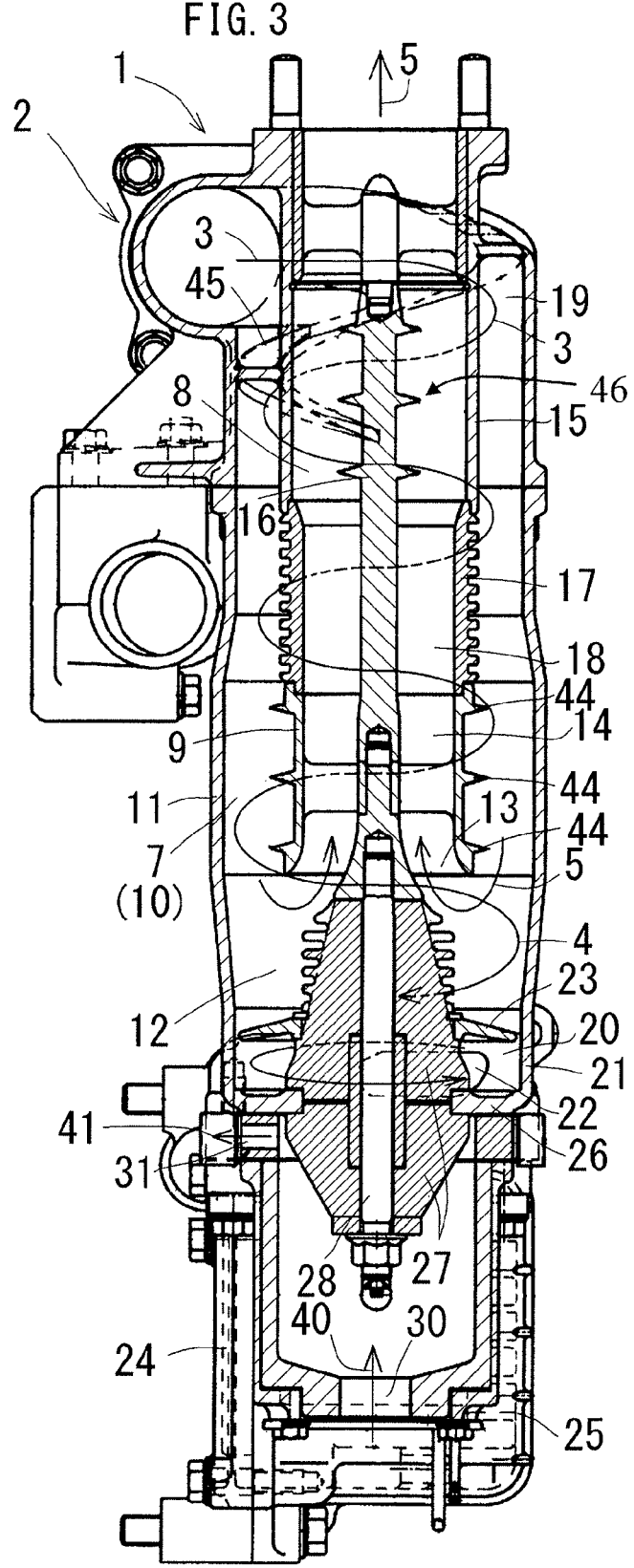
FIG. 3 is a cross-sectional view taken along a line III-III in FIG. 2
Figure 4:
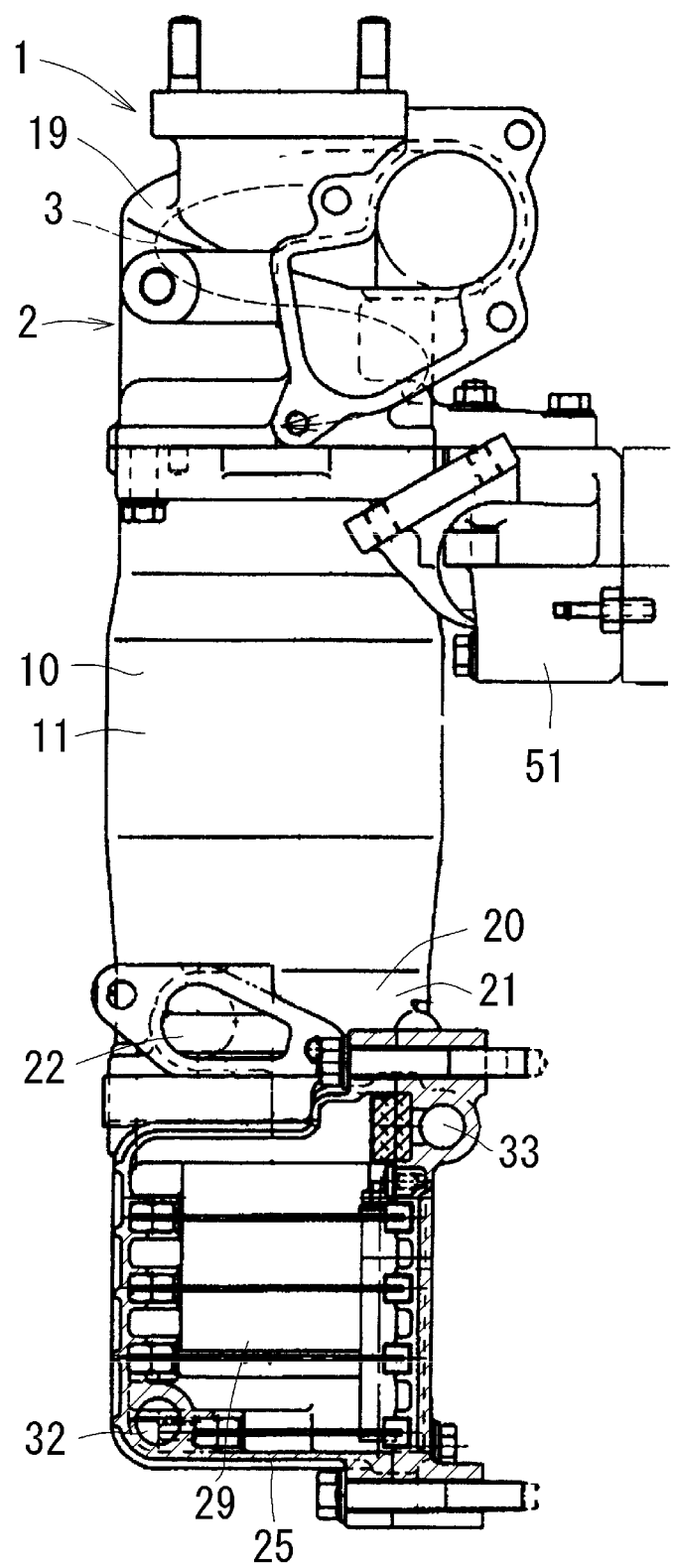
FIG. 4 is a diagram, as viewed from a IV direction in FIG. 2, of the device in which a supercharger or the like is removed from an exhaust flow divider and a power supply box is cut longitudinally.

As illustrated in FIG. 2 or FIG. 3, a first corona discharge passage (7) and a second corona discharge passage (8) are provided at the exhaust flow divider (2), corona discharge in the first corona discharge passage (7) causes the PM, water vapor, and oxygen in the exhaust (3) to generate electron attachment, electrostatic force causes the exhaust (3) to flow the EGR gas (4) with the electron-attached PM, water vapor, and oxygen which are unevenly distributed and the remaining discharged gas (5) in a divided manner, the discharged gas (5) is guided to the second corona discharge passage (8), and corona discharge in the second corona discharge passage (8) causes gas molecules in the discharged gas (5) to dissociate, thereby reducing NOx in the discharged gas (5) to $N_2$.

As illustrated in FIG. 2 or FIG. 3, a center cylinder (9) is disposed at a center part of the exhaust flow divider (2), an exhaust swirling passage (10) is provided around this center cylinder (9), the exhaust swirling passage (10) serves as the first corona discharge passage (7), the center cylinder (9) serves as a negative electrode of the first corona discharge passage (7), and an outer circumference wall (11) of the exhaust swirling passage (10) serves as a positive electrode of the first corona discharge passage (7).

The electron-attached PM in the exhaust (3) swirling in the exhaust swirling passage (10) is unevenly distributed near the outer circumference wall (11) of the exhaust swirling passage

(10) by electrostatic force and centrifugal force, and the EGR gas (4) containing the electron-attached PM unevenly distributed is caused to flow to an exhaust swirling passage end part (12) in a divided manner.

As illustrated in FIG. 3, a plurality of needle-shaped projections (44) are arranged at an outer circumference of the center cylinder (9) serving as the negative electrode of the first corona discharge passage (7) in a circumferential direction, and this plurality of needle-shaped projections (44) is arranged in a plurality of rows in a passage forming direction of the first corona discharge passage (7). A negative polarity corona discharge is performed in this first corona discharge passage (7).

An inner diameter of the outer circumferential wall (11) around the center cylinder (9) is larger than other inner diameters in the exhaust flow divider (2), and reduction of a passage cross-sectional area by the needle-shaped projections (44) is recovered.

As illustrated in FIG. 2 or FIG. 3, a discharged gas entry port (13) is provided at the center cylinder (9) serving as the negative electrode of the first corona discharge passage (7), an interior of the center cylinder (9) serves as a discharged gas lead-out passage (14), and the discharged gas (5) near the center cylinder (9) in the exhaust swirling passage (10) is caused to flow from the discharged gas entry port (13) into the discharged gas lead-out passage (14) in a divided manner.

As illustrated in FIG. 2 or FIG. 3, a downstream side center cylinder (15) concentric with the center cylinder (9) is provided on a downstream side of the center cylinder (9) in a discharged gas lead-out direction, an interior of this downstream side center cylinder (15) serves as the second corona discharge passage (8), the downstream side center cylinder (15) serves as a positive electrode of the second corona discharge passage (8), a core material (16) inserted into a center part of the downstream side center cylinder (15) serves as a negative electrode of the second corona discharge passage (8), a relay cylinder (17) serving as an electric insulator is interposed between the center cylinder (9) and the downstream side center cylinder (15), an interior of the relay cylinder (17) serves as a discharged gas relay passage (18), the discharged gas lead-out passage (14) and the second corona discharge passage (8) are communicated with each other via this discharged gas relay passage (18), the core material (16) is electrically connected with the center cylinder (9), and an outside of the downstream side center cylinder (15) serves as a swirling approach passage (19) positioned on an exhaust upstream side of the exhaust swirling passage (10).

As illustrated in FIG. 3, a plurality of needle-shaped projections (46) are arranged at an outer circumference of the core material (16) serving as a negative electrode of the second corona discharge passage (8) in a circumferential direction, and this plurality of needle-shaped projections (46) are arranged in a plurality of rows in a passage forming direction of the second corona discharge passage (8). A negative polarity corona discharge is performed in this second corona discharge passage (8).

As irregularities are provided at an outer circumference of the relay cylinder (17) and a surface area of the relay cylinder (17) is increased, an attachment area of soot attached to the relay cylinder (17) is increased. Accordingly, electric resistance of the soot is enhanced, and occurrence of an excessive leak current is prevented.

A spiral guide vane (45) is internally installed in the swirling approach passage (19).

As illustrated in FIG. 2 or FIG. 3, an EGR gas swirling chamber (20) is provided adjacent to the exhaust swirling passage end part (12), an EGR gas outlet (22) is provided on an EGR gas swirling chamber circumference wall (21) surrounding a periphery of the EGR gas swirling chamber (20), a partition (23) is provided between the exhaust swirling passage end part (12) and the EGR gas swirling chamber (20), and the EGR gas (4) is introduced from the exhaust swirling passage end part (12) to the EGR gas swirling chamber (20) via a gap between a peripheral edge part of this partition (23) and the EGR gas swirling chamber circumference wall (21).

As illustrated in FIG. 2 or FIG. 3, a power supply relay box (24) is mounted to a lower end part of the exhaust flow divider (2), a power supply box (25) is mounted to a lateral side of this power supply relay box (24), an electric insulator (27) is provided on a lower end wall (26) of the exhaust flow divider (2), a conductor (28) penetrating the electric insulator (27) is introduced from the power supply relay box (24) to the exhaust flow divider (2), and a current is supplied from a power supply (29) in the power supply box (25) to the electrodes of the both corona discharge passages (7) (8) in the exhaust flow divider (2) via this conductor (28).

In the power supply relay box (24), electrical connection between the power supply (29) and the conductor (28) is performed via a conductive piece (53).

As illustrated in FIG. 2 or FIG. 3, the exhaust flow divider (2) has a double cylinder structure which is long in an up and down direction, and on an outer circumferential side, the swirling approach passage (19), the first corona discharge passage (7) serving as a part of the exhaust swirling passage (10), the exhaust swirling passage circumferential end part (12), and the EGR gas swirling chamber (20) are disposed in this order from above, and on a center side, the discharged gas lead-out passage (14), the discharged gas relay passage (18), and the second corona discharge passage (8) are disposed in this order from below. As illustrated in FIG. 2, the second corona discharge passage (8) is communicated with an exhaust muffler (52) disposed downstream thereof.

As irregularities are provided at an outer circumference of a part of the electric insulator (27) within the exhaust swirling passage end part (12) and a surface area of the electric insulator (27) is increased, an area of soot attached to the electric insulator (27) is increased. Accordingly, electric resistance of the soot is enhanced, and occurrence of an excessive leak current is prevented.

A pulse superposition type DC power supply is used for the power supply (29), and a DC current and a pulse current superposed on the DC current are supplied to the electrodes of the both corona discharge passages (7) (8) of the exhaust flow divider (2).

As illustrated in FIG. 2 or FIG. 3, an outside air introduction port (30) is opened at a lower end part of the power supply relay box (24), an inside air lead-out port (31) is opened at an upper part of the power supply relay box (24), and due to convection of air by heat within the power supply relay box (24), an inside air (41) in the power supply relay box (24) is discharged from the inside air lead-out port (31), and an outside air (40) is introduced into the power supply relay box (24) from the outside air introduction port (30).

As illustrated in FIG. 2, a clear air inlet (32) and an inside air outlet (33) are provided in the power supply box (25), the clean air inlet (32) is communicated with an air cleaner (34), the inside air outlet (33) is communicated with the air compressor inlet (36) of the supercharger (35), an inside air (43) within the power supply box (25) is discharged from the inside air outlet (33) with suction force of the supercharger (35), and a clean air (42) in the air cleaner (34) is introduced into the power supply box (25) from the clean air inlet (32).

Figure 5:
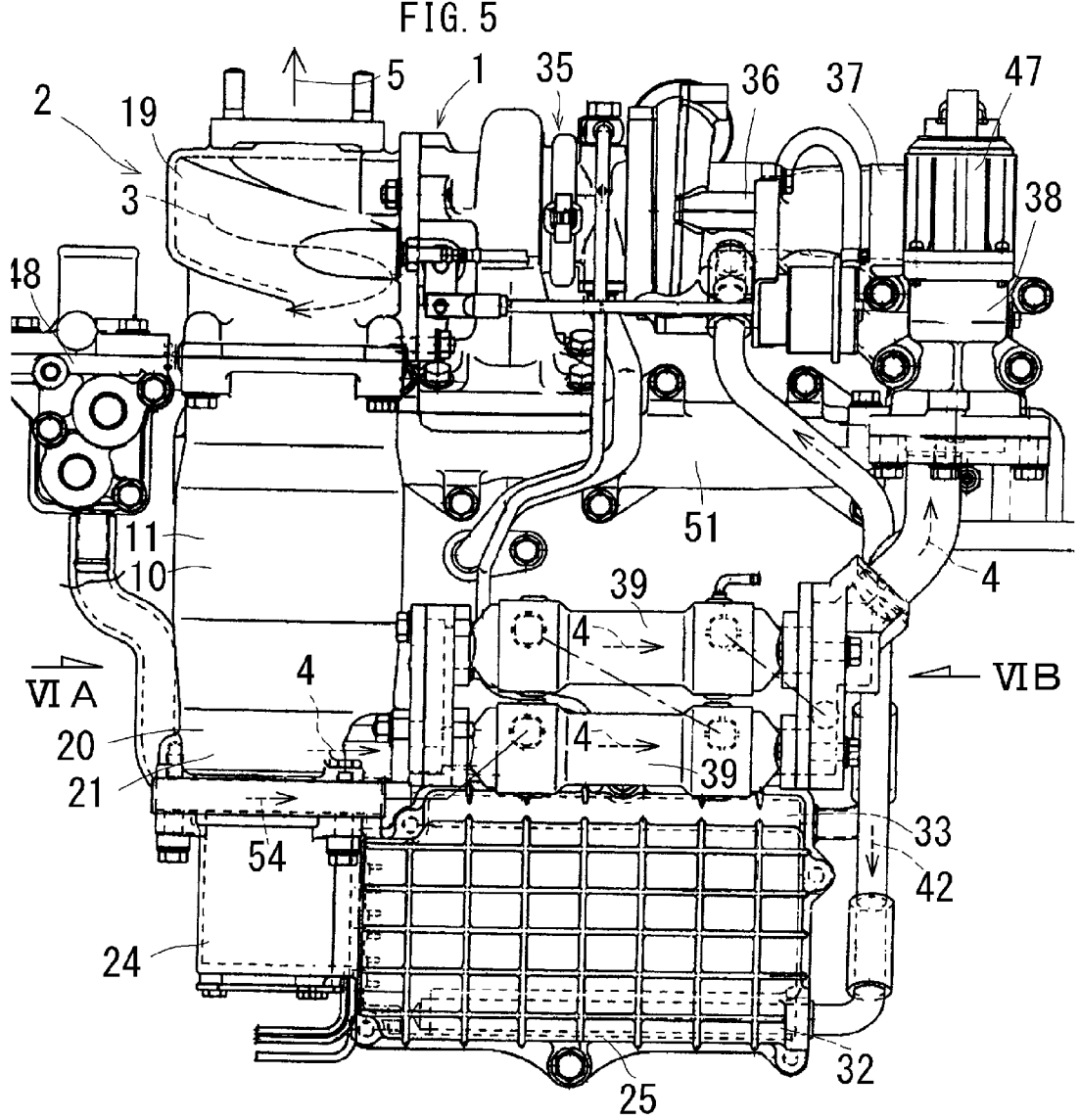
FIG. 5 is a side view of the exhaust treatment device for the diesel engine according to the embodiment of the present invention.

As illustrated in FIG. 2, FIG. 5, and FIGS. 6(A) (B), the supercharger (35) positioned directly above the power supply box (25) is mounted on an upper lateral side of the exhaust flow divider (2).

The exhaust separator (2) is long in the up and down direction.

Figure 7A:
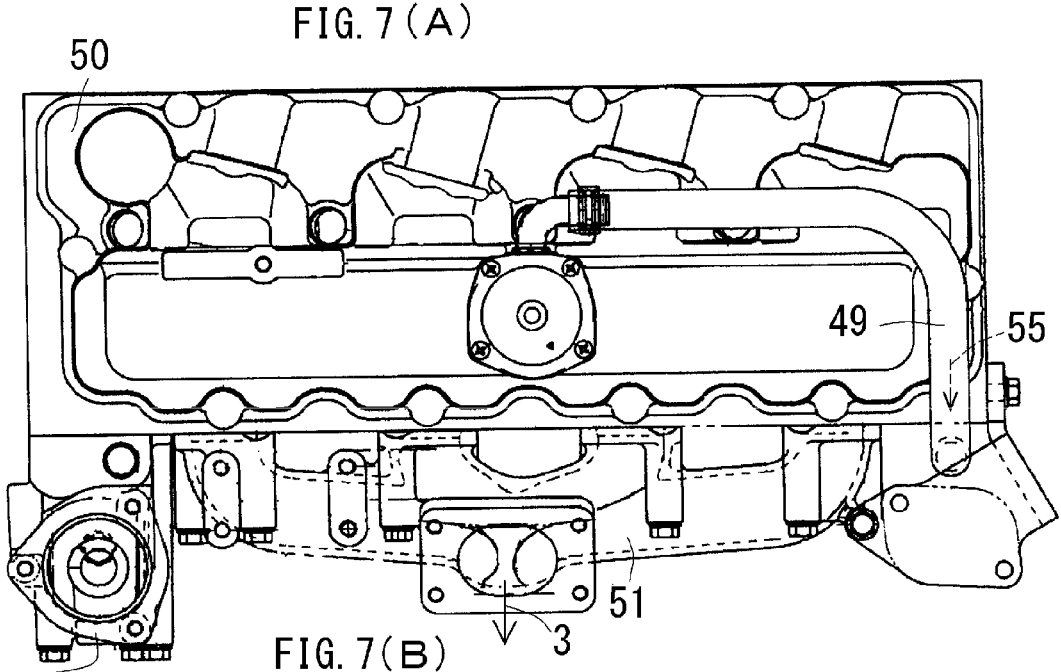
FIG. 7(A) is a plan view of an engine main body.
Figure 7B:
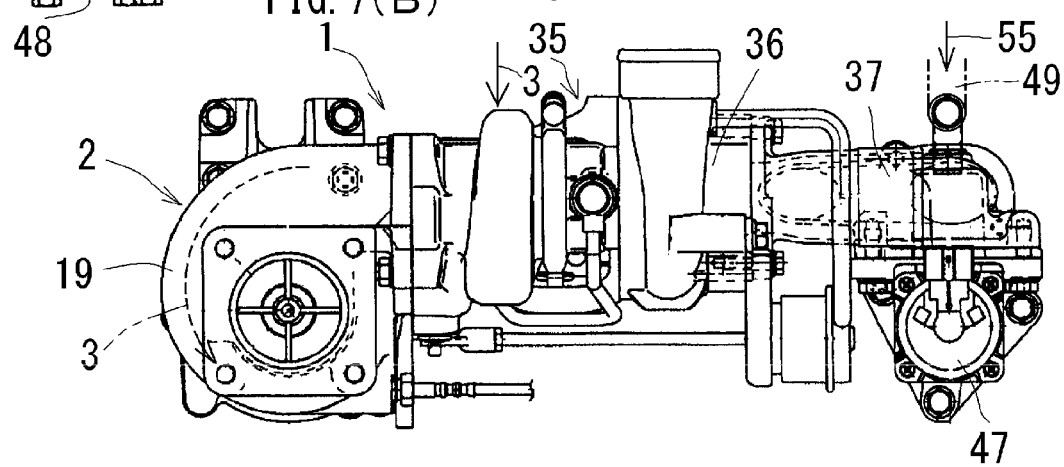
FIG. 7(B) is a plan view of the exhaust treatment device for the diesel engine according to the embodiment of the present invention, which is mounted on this engine main body.

As illustrated in FIGS. 7(A) (B), the supercharger (35) is mounted on an exhaust manifold (51) mounted on a cylinder head (50).

As illustrated in FIG. 5 and FIG. 6(B), an intake air inlet pipe (37) is mounted to the air compressor inlet (36) of the supercharger (35), the EGR valve case (38) is mounted to this intake air inlet pipe (37), the EGR cooler (39) positioned directly above the power supply box (25) is mounted on a lower lateral side of the exhaust flow divider (2), and the EGR gas outlet (22) in the exhaust flow divider (2) is communicated with the EGR valve case (38) via the EGR cooler (39).

A breather pipe (49) is communicated with the intake air inlet pipe (37), and a blowby gas (55) is introduced into the intake air inlet pipe (37).

A valve driving actuator (47) of an EGR valve (38a) is mounted on an upper part of the EGR valve case (38).

An engine cooling water (54) is supplied from a cooling water jacket (not illustrated) of the cylinder head (50) to the EGR cooler (39) via an engine cooling water outlet part (48).

DESCRIPTION OF REFERENCE SIGNS (1): Exhaust path
(2): Exhaust flow divider
(3): Exhaust
(4): EGR gas
(5): Discharged gas
(6): Combustion chamber
(7): First corona discharge passage
(8): Second corona discharge passage
(9): Center cylinder
(10): Exhaust swirling passage
(11): Outer circumference wall
(12): Exhaust swirling passage end part
(13): Discharged gas entry port
(14): Discharged gas lead-out passage
(15): Downstream side center cylinder
(16): Core material
(17): Relay cylinder
(18): Discharged gas relay passage
(19): Swirling approach passage
(20): EGR gas swirling chamber
(21): EGR gas swirling chamber circumference wall
(22): EGR gas outlet
(23): Partition
(24): Power supply relay box
(25): Power supply box
(26): Lower end wall
(27): Electric insulator
(28): Conductor
(29): Power supply
(30): Outside air introduction port
(31): Inside air lead-out port
(32): Clean air inlet
(33): Inside air outlet
(34): Air cleaner
(35): Supercharger
(36): Air compressor inlet
(37): Intake air inlet pipe
(38): EGR valve case
(39): EGR cooler
(40): Outside air
(41): Inside air
(42): Clear air
(43): Inside air

The invention claimed is:

1. An exhaust treatment device for a diesel engine in which an exhaust flow divider is provided in an exhaust path, the exhaust flow divider causes an exhaust to flow an EGR gas with PM unevenly distributed and a remaining discharged gas in a divided manner, the EGR gas is recirculated to a combustion chamber, and the discharged gas is discharged to an atmospheric side, wherein a first corona discharge passage and a second corona discharge passage are provided at the exhaust flow divider, a first corona discharge in the first corona discharge passage causes the PM, water vapor, and oxygen in the exhaust to generate electron attachment, and electrostatic force causes the exhaust to flow the EGR gas with the electron-attached PM, water vapor, and oxygen unevenly distributed and the remaining discharged gas in a divided manner, the discharged gas is guided to the second corona discharge passage, a second corona discharge in the second corona discharge passage causes gas molecules in the discharged gas to dissociate, and NOx in the discharged gas is reduced to $N_2$, wherein a center cylinder is disposed at a center part of the exhaust flow divider, an exhaust swirling passage is provided around this center cylinder, the exhaust swirling passage serves as the first corona discharge passage, the center cylinder serves as a first-corona negative electrode of the first corona discharge passage, an outer circumference wall of the exhaust swirling passage serves as a positive electrode of the first corona discharge passage, the electron-attached PM in the exhaust swirling in the exhaust swirling passage is unevenly distributed near the outer circumference wall of the exhaust swirling passage by electrostatic force and centrifugal force, and the EGR gas containing the electron-attached PM unevenly distributed is caused to flow into an exhaust swirling passage end part in a divided manner, a discharged gas entry port is provided at the center cylinder serving as the first-corona negative electrode of the first corona discharge passage, an interior of the center cylinder serves as a discharged gas lead-out passage, and the discharged gas near the center cylinder in the exhaust swirling passage is caused to flow from the discharged gas entry port into the discharged gas lead-out passage in a divided manner, and a downstream side center cylinder concentric with the center cylinder is provided on a downstream side of the center cylinder in a discharged gas lead-out direction, an interior of this downstream side center cylinder serves as the second corona discharge passage, the downstream side center cylinder serves as a positive electrode of the second corona discharge passage, a second-corona negative electrode of the second corona discharge passage is inserted into a center part of the downstream side center cylinder, a relay cylinder serving as an electric insulator is interposed between the center cylinder and the downstream side center cylinder, an interior of the relay cylinder serves as a discharged gas relay passage, the discharged gas lead-out passage and the second corona discharge passage are communicated with each other via the discharged gas relay passage, the second-corona negative electrode is electrically connected with the center cylinder, and an outside of the downstream side center cylinder serves as a swirling approach passage positioned on an exhaust upstream side of the exhaust swirling passage.

2. The exhaust treatment device for the diesel engine according to claim 1, wherein an EGR gas swirling chamber is provided adjacent to the exhaust swirling passage end part, an EGR gas outlet is provided on an EGR gas swirling chamber circumference wall surrounding a periphery of the EGR gas swirling chamber, a partition is provided between the exhaust swirling passage end part and the EGR gas swirling chamber, and the EGR gas is introduced from the exhaust swirling passage end part to the EGR gas swirling chamber via a gap between a peripheral edge part of this partition and the gas swirling chamber circumference wall.

3. The exhaust treatment device for the diesel engine according to claim 2, wherein a power supply relay box is mounted to a lower end part of the exhaust flow divider, a power supply box is mounted to a lateral side of this power supply relay box, an electric insulator is provided on a lower end wall of the exhaust flow divider, a conductor penetrating the electric insulator is introduced from the power supply relay box to the exhaust flow divider, and a current is supplied from a power supply in the power supply box to the first-corona negative electrode of the first corona discharge passage and the second-corona negative electrode of the second corona discharge passage in the exhaust flow divider via the conductor.

4. The exhaust treatment device for the diesel engine according to claim 3, wherein a pulse superposition type DC power supply is used for the power supply, and a DC current and a pulse current superposed on the DC current are supplied to the first-corona negative electrode of the first corona discharge passage and the second-corona negative electrode of the second corona discharge passage of the exhaust flow divider.

5. The exhaust treatment device for the diesel engine according to claim 4, wherein an outside air introduction port is opened at a lower end part of the power supply relay box, an inside air lead-out port is opened at an upper part of the power supply relay box, and due to convection of air by heat within the power supply relay box, an inside air in the power supply relay box is discharged from the inside air lead-out port, and an outside air is introduced into the power supply relay box from the outside air introduction port.

6. The exhaust treatment device for the diesel engine according to claim 3, wherein an outside air introduction port is opened at a lower end part of the power supply relay box, an inside air lead-out port is opened at an upper part of the power supply relay box, and due to convection of air by heat within the power supply relay box, an inside air in the power supply relay box is discharged from the inside air lead-out port, and an outside air is introduced into the power supply relay box from the outside air introduction port.

7. The exhaust treatment device for the diesel engine according to claim 1, wherein a power supply relay box is mounted to a lower end part of the exhaust flow divider, a power supply box is mounted to a lateral side of this power supply relay box, an electric insulator is provided on a lower end wall of the exhaust flow divider, a conductor penetrating the electric insulator is introduced from the power supply relay box to the exhaust flow divider, and a current is supplied from a power supply in the power supply box to the first-corona negative electrode of the first corona discharge passage and the second-corona negative electrode of the second corona discharge passage in the exhaust flow divider via this the conductor.

8. The exhaust treatment device for the diesel engine according to claim 7, wherein a pulse superposition type DC power supply is used for the power supply, and a DC current and a pulse current superposed on the DC current are supplied to the first-corona negative electrode of the first corona discharge passage and the second-corona negative electrode of the second corona discharge passage of the exhaust flow divider.

9. The exhaust treatment device for the diesel engine according to claim 8, wherein an outside air introduction port is opened at a lower end part of the power supply relay box, an inside air lead-out port is opened at an upper part of the power supply relay box, and due to convection of air by heat within the power supply relay box, an inside air in the power supply relay box is discharged from the inside air lead-out port, and an outside air is introduced into the power supply relay box from the outside air introduction port.

10. The exhaust treatment device for the diesel engine according to claim 7, wherein an outside air introduction port is opened at a lower end part of the power supply relay box, an inside air lead-out port is opened at an upper part of the power supply relay box, and due to convection of air by heat within the power supply relay box, an inside air in the power supply relay box is discharged from the inside air lead-out port, and an outside air is introduced into the power supply relay box from the outside air introduction port.

11. The exhaust treatment device for the diesel engine according to claim 7, wherein a supercharger is mounted on an upper lateral side of the exhaust flow divider, directly above the power supply box.

12. The exhaust treatment device for the diesel engine according to claim 7, wherein an intake air inlet pipe is mounted to an air compressor inlet of a supercharger, an EGR valve case is mounted to the intake air inlet pipe, an EGR cooler positioned directly above the power supply box is mounted on a lower lateral side of the exhaust flow divider, and an EGR gas outlet of the exhaust flow divider is communicated with the EGR valve case via the EGR cooler.

13. An exhaust treatment device for a diesel engine in which an exhaust flow divider is provided in an exhaust path, the exhaust flow divider causes an exhaust to flow an EGR gas with PM unevenly distributed and a remaining discharged gas in a divided manner, the EGR gas is recirculated to a combustion chamber, and the discharged gas is discharged to an atmospheric side, wherein a first corona discharge passage and a second corona discharge passage are provided at the exhaust flow divider, corona discharge in the first corona discharge passage causes the PM, water vapor, and oxygen in the exhaust to generate electron attachment, and electrostatic force causes the exhaust to flow the EGR gas with the electron-attached PM, water vapor, and oxygen unevenly distributed and the remaining discharged gas in a divided manner, the discharged gas is guided to the second corona discharge passage, corona discharge in the second corona discharge passage causes gas molecules in the discharged gas to dissociate, and NOx in the discharged gas is reduced to $N_2$, a power supply relay box is mounted to a lower end part of the exhaust flow divider, a power supply box is mounted to a lateral side of this power supply relay box, an electric insulator is provided on a lower end wall of the exhaust flow divider, a conductor penetrating the electric insulator is introduced from the power supply relay box to the exhaust flow divider, and a current is supplied from a power supply in the power supply box to the first-corona negative electrode of the first corona discharge passage and the second-corona negative electrode of the second corona discharge passage in the exhaust flow divider via the conductor, and a clear air inlet and an inside air outlet are provided in the power supply box, the clean air inlet is communicated with an air cleaner, the inside air outlet is communicated with an air compressor inlet of a supercharger, an inside air within the power supply box is discharged from the inside air outlet with suction force of the supercharger, and a clean air of the air cleaner is introduced into the power supply box from the clean air inlet.

14. The exhaust treatment device for the diesel engine according to claim 13, wherein a center cylinder is disposed at a center part of the exhaust flow divider, an exhaust swirling passage is provided around this center cylinder, the exhaust swirling passage serves as the first corona discharge passage, the center cylinder serves as a first-corona negative electrode of the first corona discharge passage, an outer circumference wall of the exhaust swirling passage serves as a positive electrode of the first corona discharge passage, and the electron-attached PM in the exhaust swirling in the exhaust swirling passage is unevenly distributed near the outer circumference wall of the exhaust swirling passage by electrostatic force and centrifugal force, and the EGR gas containing the electron-attached PM unevenly distributed is caused to flow into an exhaust swirling passage end part in a divided manner.

15. The exhaust treatment device for the diesel engine according to claim 14, wherein a discharged gas entry port is provided at the center cylinder serving as the first-corona negative electrode of the first corona discharge passage, an interior of the center cylinder serves as a discharged gas lead-out passage, and the discharged gas near the center cylinder in the exhaust swirling passage is caused to flow from the discharged gas entry port into the discharged gas lead-out passage in a divided manner.

16. The exhaust treatment device for the diesel engine according to claim 15, wherein a downstream side center cylinder concentric with the center cylinder is provided on a downstream side of the center cylinder in a discharged gas lead-out direction, an interior of this downstream side center cylinder serves as the second corona discharge passage, the downstream side center cylinder serves as a positive electrode of the second corona discharge passage, a second-corona negative electrode of the second corona discharge passage is inserted into a center part of the downstream side center cylinder, a relay cylinder serving as an electric insulator is interposed between the center cylinder and the downstream side center cylinder, an interior of the relay cylinder serves as a discharged gas relay passage, the discharged gas lead-out passage and the second corona discharge passage are communicated with each other via the discharged gas relay passage, the second-corona negative electrode is electrically connected with the center cylinder, and an outside of the downstream side center cylinder serves as a swirling approach passage positioned on an exhaust upstream side of the exhaust swirling passage.

17. The exhaust treatment device for the diesel engine according to claim 14, wherein an EGR gas swirling chamber is provided adjacent to the exhaust swirling passage end part, an EGR gas outlet is provided on an EGR gas swirling chamber circumference wall surrounding a periphery of the EGR gas swirling chamber, a partition is provided between the exhaust swirling passage end part and the EGR gas swirling chamber, and the EGR gas is introduced from the exhaust swirling passage end part to the EGR gas swirling chamber via a gap between a peripheral edge part of this partition and the gas swirling chamber circumference wall.

18. The exhaust treatment device for the diesel engine according to claim 17, wherein a discharged gas entry port is provided at the center cylinder serving as the first-corona negative electrode of the first corona discharge passage, an interior of the center cylinder serves as a discharged gas lead-out passage, and the discharged gas near the center cylinder in the exhaust swirling passage is caused to flow from the discharged gas entry port into the discharged gas lead-out passage in a divided manner.

19. The exhaust treatment device for the diesel engine according to claim 18, wherein a downstream side center cylinder concentric with the center cylinder is provided on a downstream side of the center cylinder in a discharged gas lead-out direction, an interior of this downstream side center cylinder serves as the second corona discharge passage, the downstream side center cylinder serves as a positive electrode of the second corona discharge passage, a second-corona negative electrode of the second corona discharge passage is inserted into a center part of the downstream side center cylinder, a relay cylinder serving as an electric insulator is interposed between the center cylinder and the downstream side center cylinder, an interior of the relay cylinder serves as a discharged gas relay passage, the discharged gas lead-out passage and the second corona discharge passage are communicated with each other via the discharged gas relay passage, the second-corona negative electrode is electrically connected with the center cylinder, and an outside of the downstream side center cylinder serves as a swirling approach passage positioned on an exhaust upstream side of the exhaust swirling passage.

20. The exhaust treatment device for the diesel engine according to claim 13, wherein a pulse superposition type DC power supply is used for the power supply, and a DC current and a pulse current superposed on the DC current are supplied to the first-corona negative electrode of the first corona discharge passage and the second-corona negative electrode of the second corona discharge passage of the exhaust flow divider.

\* \* \* \* \*